United States Patent
Wu et al.

(10) Patent No.: US 6,512,852 B1
(45) Date of Patent: Jan. 28, 2003

(54) METHOD AND APPARATUS FOR CONCATENATING BITS OF ODD-LENGTH WORDS

(75) Inventors: Tony H. Wu, Milpitas, CA (US); Ren-Yuh Wang, Cupertino, CA (US)

(73) Assignee: Divio, Inc., Sunnyvale, CA (US)

(*) Notice: Subject to any disclaimer, the term of this patent is extended or adjusted under 35 U.S.C. 154(b) by 0 days.

(21) Appl. No.: 09/263,588

(22) Filed: Mar. 5, 1999

Related U.S. Application Data

(60) Provisional application No. 60/077,295, filed on Mar. 6, 1998, and provisional application No. 60/077,191, filed on Mar. 6, 1998.

(51) Int. Cl.[7] .............................................. G06K 9/36
(52) U.S. Cl. ...................................................... 382/232
(58) Field of Search ................................ 382/232, 236, 382/238, 240, 242, 248, 250; 358/432, 433; 348/384.1, 394.1, 395.1, 400.1, 401.1–404.1, 407.1–416.1, 420.1–421.1, 425.2, 430.1, 431.1; 360/32, 46, 48, 53, 64, 78.07, 78.15; 345/22, 543, 549, 593; 703/26; 707/528, 504; 714/770, 785; 717/8, 9; 375/240.23, 240.24

(56) References Cited

U.S. PATENT DOCUMENTS

| | | | |
|---|---|---|---|
| 5,359,468 A | * | 10/1994 | Rhodes et al. ................ 360/48 |
| 5,521,940 A | | 5/1996 | Lane et al. |
| 5,652,889 A | * | 7/1997 | Sites .......................... 395/708 |
| 5,668,598 A | | 9/1997 | Linzer et al. |
| 5,703,907 A | | 12/1997 | James |
| 5,767,912 A | | 6/1998 | Bunting et al. |
| 5,784,110 A | | 7/1998 | Acampora et al. |
| 5,806,081 A | * | 9/1998 | Swen et al. ................. 707/528 |
| 6,104,755 A | | 8/2000 | Ohara |
| 6,111,916 A | | 8/2000 | Talluri et al. |
| 6,128,338 A | | 10/2000 | Behaghel et al. |
| 6,167,551 A | * | 12/2000 | Nguyen et al. ............. 714/770 |
| 6,181,742 B1 | | 1/2001 | Rajagopalan et al. |
| 6,219,457 B1 | | 4/2001 | Potu |

\* cited by examiner

*Primary Examiner*—Jose L. Couso
(74) *Attorney, Agent, or Firm*—Townsend and Townsend and Crew LLP

(57) ABSTRACT

New and improved methods and apparatus for concatenating data words from a bitstream. These techniques are especially suited to digital video applications, in which input to a video decoder is generated in order to determine run lengths and amplitudes. This implementation is suitable for widely-used image compression standards that integrate various algorithms into a compression system, such as the standards specified in the Digital Video Standard (the "Blue Book").

3 Claims, 2 Drawing Sheets

METHOD AND APPARATUS FOR CONCATENATING BITS OF ODD-LENGTH WORDS

CROSS-REFERENCES TO RELATED APPLICATIONS

This application claims priority from U.S. Provisional Patent Application Nos. 60/077,295 and 60/077,191, both filed Mar. 6, 1998, which are incorporated herein by reference in their entirety for all purposes.

BACKGROUND OF THE INVENTION

The present invention relates to the field of image processing. More specifically, the present invention relates to methods and apparatus for concatenating data words from a bitstream. These techniques are especially suited to digital video applications, in which input to a video decoder is generated in order to determine run lengths and amplitudes. This implementation is suitable for widely-used image compression standards that integrate various algorithms into a compression system, such as the standards specified in the Digital Video Standard (the "Blue Book"), by the Joint Photographic Experts Group (the JPEG standard), and by the Motion Picture Experts Group (the MPEG standard).

An encoded digital video bitstream is a very long combination of zeroes and ones. In order to better store these values, each set of 16 bits are packed into one word. The key issue in the decoding process is that it is a recursive operation, where the next result will depend on the current result. In other words, the point at which a first word ends must be known, in order to know where the next word begins. Thus, without knowing the present word boundaries, it will be infeasible to predict the next word's boundary and so identify that word. That means parallel execution of decoding is not feasible with limited gate counts.

What is therefore required is a bit selection apparatus that provides fast efficient concatenation of bits to form words. Moreover, a technique of this type should support the concatenation of bits in words with bits that are not properly justified, on a word-to-word basis. Preferably, this implementation should be relatively small in terms of area required when implemented in an integrated circuit. Finally, the implementation should provide an acceptable level of computational accuracy (and so image quality).

SUMMARY OF THE INVENTION

The present invention solves the problems associated with the prior art by providing a method and apparatus for efficiently and accurately concatenating data words from a bitstream.

According to the present invention, the input word may be partial word whose length is smaller than 16-bits. A second subtractor is used to keep track of bits remaining in sel [15:0]. A bit-selector is also used. The bit selector is implemented using random-logic with extended selection range (48-bit inputs).

According to the present invention, whenever a block stops decoding without an EOB token being found, it will store the last-received, right aligned 16-bit word in the scratch memory. Otherwise, if the block is finished, the left-aligned 16-bit word found in sel[15:0] will be stored into the scratch memory, shown as memory attached to the video decoder in FIG. 1. In the second or the third pass, the unfinished block will put the right aligned word in prev [15:0] and put the left-aligned word which is read from scratch memory in next[15:0].

These and other embodiments of the present invention, as well as its advantages and features are described in more detail in conjunction with the text below and attached figures.

DESCRIPTION OF THE SPECIFIC EMBODIMENTS

Figure 1:
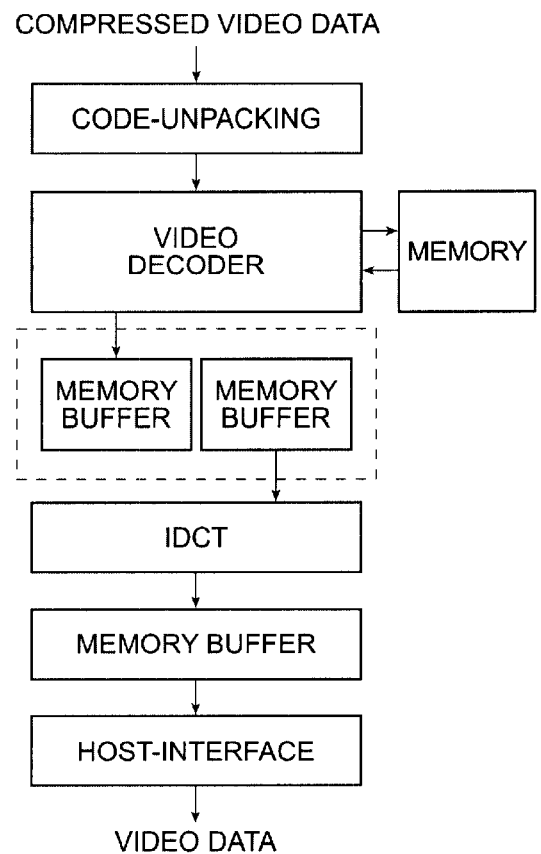
FIG. 1 illustrates a block diagram of the DV decoding process.

As noted, an encoded digital video bitstream is a very long combination of zeroes and ones. In order to store these values more efficiently, each set of 16 bits are packed into one word. The DV video decoder (VLD) receives 16-bit data from code-unpacking module (CUM) and decodes the bitstream into individual pixel values. The decoded values are then stored in a memory unit in order to allow an IDCT unit to execute an inverse DCT on the data so stored. The operation is based on individual video-segment. The overall process is illustrated in FIG. 1, which is an overall block diagram of decoding process.

Fortunately, the performance required is not high (in relative terms). For example, because the portion of one type of decoder which performs the DCT processes on the order of 1 pixel/cycle, the data needs only to be provided at such a rate. For example, after careful simulation, it was found that approximate one pixel per cycle would be adequate for certain DV applications. This is mainly because the IDCT process will need a (greater) fixed amount of cycles than the decoding process. These simulations showed that the performance remains quite good, even with some access penalty between the VLD and VUNPACK.

Figure 2:
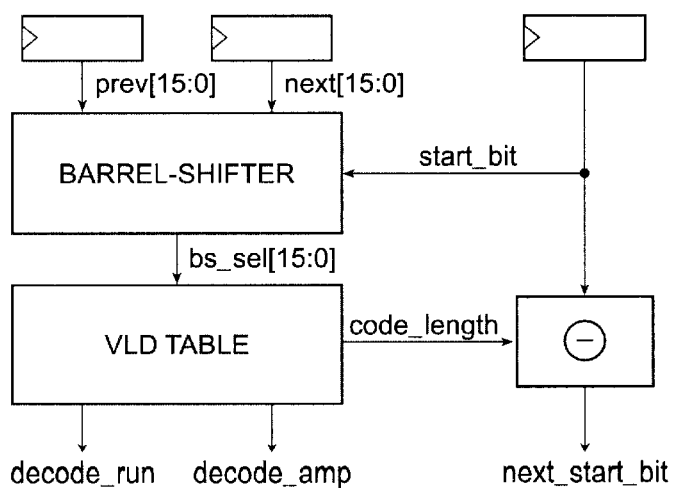
FIG. 2 illustrates a video decoder.

One solution is to provide a way to decode the codeword in 16-bit packed format. The diagram is illustrated in FIG. 2 where a barrel-shifter is used to select 16 bits from the concatenated prev[15:0] and next[15:0], which is equal to left-align the bitstream for decoding. The result bs_sel [15:0] is then sent to VLD table to look up the (run, amp) pair. Code length is also determined at the same time in order to decide whether the code is valid. If the code is valid, (run, amp) pair of data are sent to next decoding stage for further processing. Otherwise, a new 16-bit word is read into next[15:0] and the decoding continues.

Figure 3:
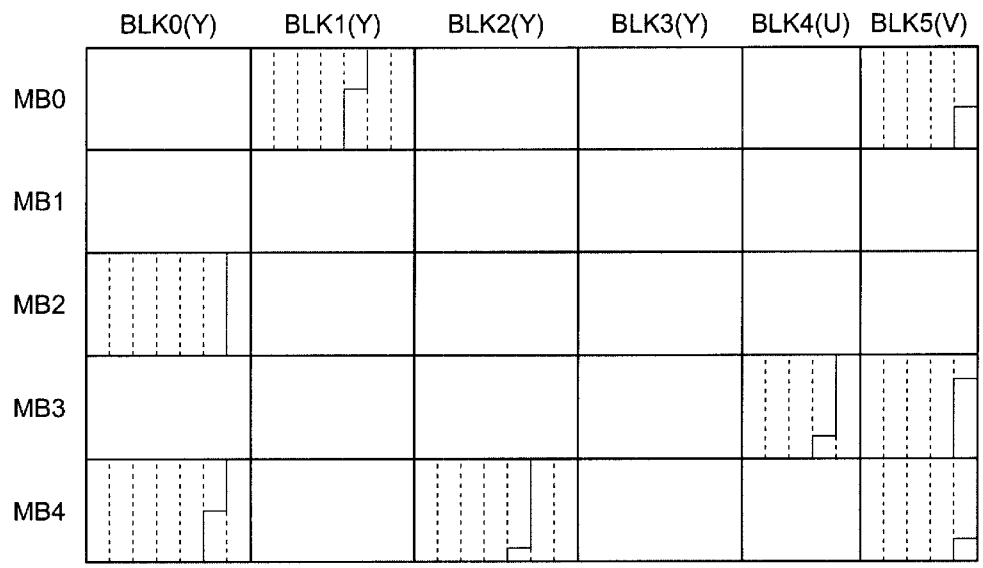
FIG. 3 illustrates data allocation in one video segment after first-pass processing in a system according to the present invention.

FIG. 3 illustrates data allocation in one video segment after first-pass processing. The challenge is that the DV decoding process involves three passes, which might involve data not just coming from its own block but possibly from other blocks in the same video segment. The data storage in each video segment is illustrated in FIG. 3 to help explain the details. Each video segment consists of 5 macro blocks (MB) where each macro block includes 6 blocks (BLK). The first 4 blocks in each macro block are Y blocks which occupy 7 full 16-bit words and the next two blocks are U, V blocks which use 5 full 16-bit words. In the first pass the decoder will decode every word in each individual block, as is done in other JPEG and MPEG video decoders. The decoding process stops if either an end of block (EOB) token is found or the end of data occurs. The blocks that finish with an EOB token are called finished blocks and the rest of the blocks are classified as unfinished blocks. The unfinished blocks are filled with gray color and the finished blocks are filled with white. The solid lines in the finished blocks represent the dividers indicating the EOB token boundary where the dotted line represents the word boundary. The data on the right of the dividers comes from other unfinished blocks or unused blocks.

One thing that differs between DV video decoding and regular video decoding is that DV video decoding will try to continue with data from finished blocks for those unfinished blocks in the second and the third pass. Doing this can effectively increase the video quality by having more data in but not increase the bitstream size.

In pass 2, the unfinished blocks will continue with data coming from other finished blocks in the same macro-block. The data could be one full 16-bit word, but most possibly partial word. Take the first macro blocks (MB0) in FIG. 3 an example. Blocks 0, 2, 3, 4 are unfinished blocks and blocks 1 and 5 are finished blocks with extra space to hold additional data. Therefore, BLK0 will continue decoding with the data coming from the BLK1. The data will be the partial word in the fourth word in BLK1. In this case the scheme shown in FIG. 2 can't be applied because it can't cope with two left-aligned words. Therefore, a technique is required to be applied to the structure in order to make it operative in such situations.

If both 5-th and 6-th data are used, block 0 will continue with data coming from block 5. Once the partial word in block 5 are used and no EOB token is found, the decoding process for macro block 0 will stop and the decoder will continue on other macro blocks. If not all the extra spaces are used for block 0, block 2 will continue with whatever bits left. The second pass will stop whenever there are no more extra data left in individual macro blocks.

The third pass then continues with data coming from other finished blocks in other macro-block. If BLK0 in MB0 uses all the data and still can't find EOB token, it might continue with data coming from MB2, MB3, MB4. In this situation, receiving a partial codeword is very common. In the worst case there are still unfinished blocks after pass three, the rest of unfilled pixels will be filled with value zeros. This is part of the truncation that occurs in DV, which is basically a tradeoff between the compression ratio available, and the detail necessary to produce an acceptable picture.

However, this technique can result in the packed words containing portions of one data word and portions of another data word. Thus, a method is required for concatenating the bits from one packed word and a subsequent packed word to generate the next data word. The present invention provides this ability. Moreover, the present invention is capable of concatenating bits from two packed words, even though the desired bits are not aligned in a manner that facilitates such concatenation. It does so by keeping track of where one data word stops and another begins, within a current packed word. This information is used by a bit selector to select the proper bits from the current packed word and the next packed word, allowing the next data word to be easily extracted, as described below.

The technique is based on the following approaches for a memory- and cost-efficient decoder that can not only handle the full 16-bit incoming word, but also the case where only partial word is provided.

Figure 4:
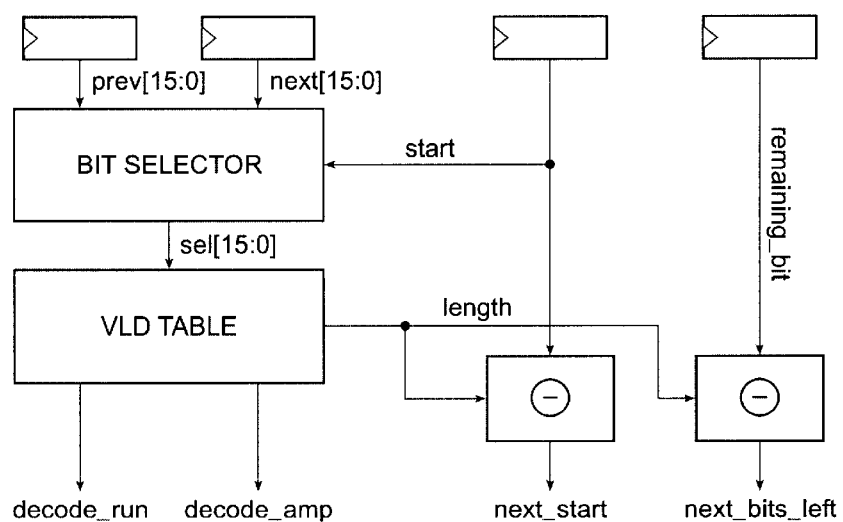
FIG. 4 illustrates a data-path for digital video decoding according to the present invention.

1. A data-path according to the present invention that handles the decoding is illustrated in FIG. 4. The approach of FIG. 2 assumes that the input word is always 16-bit long. That means new word is needed whenever the next start bit falls into the next[15:0]. In the DV decoding case, the input word could be partial word with a length that is smaller than 16-bits. A second subtractor is added to keep track of bits remaining in the sel[15:0]. The barrel-shifter of FIG. 2 is also replaced by a bit-selector, which is implemented by using random-logic with extended selection range (48-bit inputs).

2. Scratch memory, preferably 30×33 in size, is also employed: This memory is used to temporarily store information so the decoder can refer them in pass 2 and 3. For each one in the (30) blocks there is a 33-bit word, including one 16-bit word for continuation, start (5 bits) and remaining length (5 bits), along with a quantization number (4 bits), DCT-type (1 bit) and class number (2 bits). One advantageous feature of this memory is that this memory is so well-compacted that it could be shared with an encoder. For example, if the encoder uses two 30×33 memory, one or both of these could be shared with the bit selector.

3. An algorithm for handling the partial word case: Whenever a block stops decoding without an EOB token being found, it will store the last-received, right aligned 16-bit word in the scratch memory. Otherwise, if the block is finished, the left-aligned 16-bit word found in sel[15:0] will be stored into the scratch memory, shown as memory attached to the video decoder in FIG. 1. In the second or the third pass, the unfinished block will put the right aligned word in prev[15:0] and put the left-aligned word which is read from scratch memory in next[15:0].

The present invention offers many benefits. These include the provision of an efficient solution and a reduction in areal requirements due to the lack of a separate concatenation unit. The two bitstreams are thus perfectly concatenated and so no additional concatenation unit is required.

Further details of other embodiments of the present invention can be found in Appendices A and B which are attached hereto. These appendices also include additional figures.

The techniques of the present invention are therefore readily implemented in an integrated circuit to allow the efficient compression and decompression of digitally encoded images, while consuming a minimal amount of integrated circuit area. The techniques of the present invention comply with the Digital Video Standard (the "Blue Book"). These techniques can also be of use in systems implementing other standards, such as the International Standards Organization's (ISO) Joint Photographic Experts Group (JPEG) standard, ISO DIS 10918-1, and is JPEG-compliant, as set forth in ISO DIS 10918-2. These standards are included by reference herein, in their entirety. Moreover, the techniques of the present invention can be understood in the framework of a JPEG image compression/decompression system, such as that outline in "JPEG Still Image Data Compression Standard" by W. B. Pennebaker and J. L. Mitchell, which is also included by reference herein, in its entirety.

As will be understood by those with ordinary skill in the art, the present invention may be embodied in other specific forms without departing from the spirit or essential characteristics thereof. For example, the techniques of the present invention can also be applied to other compression systems such as the standards specified by Motion Picture Experts Group (MPEG), or MPEGII. These standards are included by reference herein, in their entirety and for all purposes.

Alternately, the techniques of the present invention can be implemented in a computer system. For example, the systems of FIGS. 1, 2, and 4 can be implemented on a peripheral component interconnect (PCI) card. The PCI card can be installed onto the PCI bus of a personal computer. Also, other bus technologies such as NUBUS, ISA, EISA, Universal Serial Bus (USB), 1394 bus, and Accelerated Graphics Port (AGP) can also be utilized. Also, the techniques of the present invention can be implemented by utilizing the available routines and features such as caching, new instruction sets, and single instruction multiple data (SIMD) tools which are provided by Intel® Corporation's MMX™ technology, Advance Micro Device,® Inc.'s 3DNow!™ technology, and their equivalents. Additionally, even though the techniques of the present invention (such as specified in appendix B) have been discussed with respect to DCT transformation other types of transformations can also be utilized such as wavelet transform and vector quantization (VQ). Accordingly, for an understanding of the scope of the invention, reference should be made to the appended claims.

Also, having fully described certain features of the preferred embodiments of the present invention, many other equivalent or alternative techniques of implementing bit-shuffling according to the present invention will be apparent to those skilled in the art. Other signal processing applications that employ such bit streams may benefit from the present invention. Also, the implementation shown in the figures is but one of many possible architectures which may be designed to take advantage of the method of the present invention. These equivalents and alternatives, and others, are intended to be included within the scope of the present invention.

What is claimed is:

1. An apparatus for properly concatenating a plurality of words from a bitstream, comprising:

a bit selector;

a first register coupled to a first input of said bit selector and configured to hold a previous data word;

a second register coupled to a second input of said bit selector and configured to hold a next data word;

a third register configured to store start bit information and coupled to a third input of said bit selector;

a fourth register configured to store remainder bit information;

a storage unit coupled to an output of said bit selector and configured to store a decode table;

a first subtractor coupled to an output of said storage unit and an output of said third register, and provides a start point for a further next data word, wherein said output of said storage unit provides length information; and a second subtractor coupled to an output of said storage unit and an output of said fourth register, and provides a remainder point for a further next data word, wherein said bit selector is capable of selecting at least one bit from each of said first and said second registers.

2. An algorithm for handling a partial word, the algorithm comprising:

waiting for a block to stop decoding without an end of block token being found;

storing a last-received, right aligned word in a scratch memory; and otherwise, if the block is finished, storing a left-aligned word found in the scratch memory.

3. The method of claim 2, wherein, during a second or a third pass, the unfinished block implies that the right aligned word is put in a prev[15:0] and the left-aligned word is read from scratch memory and is put in a next[15:0].

* * * * *